Patented July 9, 1929.

1,719,926

UNITED STATES PATENT OFFICE.

RICHARD DAMME, OF STETTIN, GERMANY.

STENCIL SHEET.

No Drawing.   Application filed November 12, 1924.   Serial No. 749,544.

My invention relates to the production of stencil sheets and more particularly to the manufacture of a new composition with which the usual sheets of yoshino paper are coated or impregnated.

According to my invention I employ collodion for the coating purpose and preferably a mixture of collodion, oleine or oleic acid, lithopone, soap, castor oil, glycerine, amylacetate and a coloring agent such as a blue aniline dye, or the like.

Yoshino paper is coated or impregnated with this mixture or composition in a known manner as for instance by drawing the paper over a roller which is partly immersed in the mixture or composition.

The following particulars are given, by way of example, to illustrate a suitable mode of carrying my invention into effect.

In preparing the composition I mix 2,800 parts by weight of collodion with 600 parts by weight of olein, 40 parts by weight of lithopone, 20 parts by weight of soap, 120 parts by weight of castor oil, 120 parts by weight of glycerine, 200 parts by weight of amylacetate and 3 parts by weight of blue aniline dye together and by stirring the mixture for a sufficient length of time I obtain a homogeneous mass or composition which I use in preparing stencil sheets in the manner indicated.

In the stencil art as practiced heretofore, when castor oil is used as a softening or tempering agent the results secured are unsatisfactory because the impregnating agent remains sticky and unusable unless powdered soapstone is dusted onto the surface. I have found that the use of oleic acid with the castor oil overcomes these objections so that I secure a stencil sheet which is, after drying, at once available to receive type impressions. I further secure a permanency in my stencil sheets through the addition of glycerine which on account of its cooperative characteristics imparts to the sheets, and retains same in the required softness which prevents the coating becoming brittle. This desirable condition overcomes the liability of the centers of loop letters breaking away. In consequence of the attainment of these results, I broadly claim the use of collodion, castor oil, oleic acid and glycerine to form a type impressible coating applied on or impregnated with any desired open porous base, such as yoshino paper.

What I claim is:—

1. A composition for use in the preparation of stencil sheets comprising a mixture of collodion, oleic acid, lithopone, soap, castor oil, glycerine, amylacetate and a dye.

2. The composition herein described for use in making stencil sheets, consisting of a mixture of 280 parts of collodion, 60 parts of oleic acid, 4 parts of lithopone, 2 parts of soap, 12 parts of castor oil, 12 parts of glycerin, 20 parts of amylacetate and a coloring agent such as blue aniline dye, all the proportions taken by weight.

3. A composition for use as a coating on an open texture cellulose base, comprising the following ingredients taken by weight, approximately collodion 2,800 parts, amyl acetate 200 parts, oleic acid 600 parts, castor oil 120 parts, lithopone 40 parts, soap 20 parts, and glycerine 120 parts.

4. A composition for use on an open texture cellulose base, comprising the following ingredients 280 grams collodion, 60 grams oleic acid, 4 grams lithopone, 2 grams soap, 12 grams castor oil, 12 grams glycerine, 20 grams amylacetate, 3 grams blue aniline dye.

5. A stencil sheet composed of yoshino paper coated with a composition comprising a mixture of collodion, oleic acid, lithopone, soap, glycerine, amylacetate and a dye.

6. The method of preparing a stencil sheet consisting in coating a sheet of yoshino paper with a composition comprising a mixture of 280 parts of collodion, 60 parts of oleic acid, 4 parts of lithopone, 2 parts of soap, 12 parts of castor oil, 12 parts of glycerine, 20 parts of amylacetate, and a coloring agent such as a blue aniline dye.

RICHARD DAMME. [L. S.]